United States Patent
Greene et al.

(10) Patent No.: US 11,463,415 B2
(45) Date of Patent: Oct. 4, 2022

(54) DIGITAL IDENTITY NETWORK ALERTS

(71) Applicant: LexisNexis Risk Solutions, Inc., Alpharetta, GA (US)

(72) Inventors: Peter Joseph Greene, Pompano Beach, FL (US); Dean Weinert, San Jose, CA (US); David Buchler, Boca Raton, FL (US); Bryan Knauss, Milton, GA (US)

(73) Assignee: LexisNexis Risk Solutions, Inc., Alpharetta, GA (US)

( * ) Notice: Subject to any disclaimer, the term of this patent is extended or adjusted under 35 U.S.C. 154(b) by 182 days.

(21) Appl. No.: 16/952,243

(22) Filed: Nov. 19, 2020

(65) Prior Publication Data
US 2022/0158982 A1    May 19, 2022

(51) Int. Cl.
*H04L 9/40* (2022.01)
*H04W 12/02* (2009.01)

(52) U.S. Cl.
CPC ........ *H04L 63/0407* (2013.01); *H04L 63/126* (2013.01); *H04L 63/1416* (2013.01); *H04L 63/1441* (2013.01); *H04L 63/20* (2013.01); *H04W 12/02* (2013.01)

(58) Field of Classification Search
CPC .............. H04L 63/0407; H04L 63/126; H04L 63/1416; H04L 63/1441; H04L 63/20; H04W 12/02; G06F 21/31; G06F 21/44; G06F 21/554
See application file for complete search history.

(56) References Cited

U.S. PATENT DOCUMENTS

| | | | |
|---|---|---|---|
| 9,398,022 B2 | 7/2016 | Piliouras | |
| 10,521,786 B2 | 12/2019 | Hefetz | |
| 10,643,217 B2 | 5/2020 | Romain et al. | |
| 10,678,898 B2 | 6/2020 | Hoyos et al. | |
| 2006/0282660 A1 | 12/2006 | Varghese et al. | |
| 2012/0215758 A1* | 8/2012 | Gottschalk, Jr. | G06F 21/6245 707/E17.108 |
| 2013/0179982 A1* | 7/2013 | Bridges | G06Q 30/0185 726/26 |

(Continued)

FOREIGN PATENT DOCUMENTS

EP    1875653 B1    12/2018

OTHER PUBLICATIONS

Mashima et al., "Towards A User-Centric Identity-Usage Monitoring System", Jun. 2008, The Third International Conference on Internet Monitoring and Protection, pp. 47-52 (Year: 2008).*

(Continued)

*Primary Examiner* — Kenneth W Chang
(74) *Attorney, Agent, or Firm* — Troutman Pepper Hamilton Sanders LLP; James E. Schutz; Mark Lehi Jones

(57) ABSTRACT

Systems and methods are disclosed for detecting certain online activities associated with a digital identity. A Digital Identity Network may be monitored for potentially fraudulent activities (such as new account openings and certain transactions) related to an enrolled User identification (User ID) without requiring personally identifying information (PII). Corresponding alerts may be generated and sent to inform the associated user of such suspicious activity so that fraudulent account access or transactions may be prevented.

20 Claims, 8 Drawing Sheets

(56) References Cited

U.S. PATENT DOCUMENTS

| | | | | |
|---|---|---|---|---|
| 2013/0268357 A1* | 10/2013 | Heath | ................... | G06Q 10/10 |
| | | | | 726/26 |
| 2014/0304157 A1* | 10/2014 | Bachenheimer | ....... | G06Q 20/02 |
| | | | | 705/44 |
| 2021/0099431 A1* | 4/2021 | Wasicek | .............. | G06F 21/6263 |

OTHER PUBLICATIONS

Enguidanos et al., "Secure monitoring for identity federations and distributed systems", Jul. 2012, IEEE 36th Annual Computer Software and Applications Conference Workshops, pp. 70-75 (Year: 2012).*

European Search Report and Written Opinion dated Mar. 23, 2022 issued in EP Application No. 21201535.8.

* cited by examiner

DIGITAL IDENTITY NETWORK ALERTS

FIELD

The disclosed technology generally relates to internet security, and to detection and prevention of potential identity theft cybercrimes by utilizing event-driven alerts.

BACKGROUND

As businesses worldwide become more reliant on the Internet for digital communications and transactions, the ever-increasing presence and sophistication of cybercrime requires new strategies to distinguish trusted customers from cybercriminals.

Private identity information is typically required for opening online accounts and/or for authenticating a user for online transactions. Passwords, usernames, Social Security numbers, credit card numbers, and other sensitive identity-related information can be stolen by criminals and utilized unbeknownst to a victim, often creating costly financial issues and severe inconveniences for the victim. If a fraudster gains access to a user's account, login information can be changed, and the user may be unable to access his or her account.

Clues that indicate identity theft can include unexplained bank account withdrawals, unfamiliar accounts or charges on a credit report, missing mail, checks refused by merchants, calls from debt collectors about unknown debts, rejected medical bill claims, etc. All too often, when identity information is stolen and used for fraud, the victim may not realize the severity of the damage until it is too late to prevent it.

In response to the Internet-age problem of increasing identity theft incidents, several identity monitoring and/or recovery services have recently emerged to help victims of data breaches and identity theft. Such services may utilize traditional databases, such as the National Change of Address database, for example, to check if a user's mail is being redirected. The effectiveness of identity monitoring depends on factors such as the quality and accuracy of the databases, how often the service checks each database, etc. There also may be activities that a service cannot monitor, such as those related to taxes, government benefits, and/or real-time online activities. Furthermore, the conventional use of matching personally identifiable information (PII) to directly detect activities involving possible identity theft can itself create serious privacy and security issues.

A need exists for improved methods of detecting and identifying threats of online fraud in real-time or near real-time to prevent or limit such identity theft-related cybercrimes.

BRIEF SUMMARY

Some or all of the above needs may be addressed by certain implementations of the disclosed technology. Systems and methods are disclosed herein for detecting certain online activities associated with a digital identity representative of a user. Certain implementations of the disclosed technology may provide alerts when online activity related to the digital identity is detected, for example, via a web-server having an installed website application programming interface (API). In certain exemplary implementations, an anonymized Digital Identity Network (DIN) may monitor online activities for potentially fraudulent events (such as new account openings) related to an enrolled user identification (User ID) without requiring the direct use of personally identifiable information (PII). Corresponding alerts may be generated and sent to inform the associated user of such suspicious activity so that further fraudulent account access or transactions may be prevented.

According to an example implementation, a system is provided. The system includes one or more processors, memory in communication with the one or more processors, and instructions stored in the memory that, when executed by the one or more processors, cause the system to perform: receiving, via a communications network, user identification (User ID) and associated personal identification information (PII) responsive to initiation of identity monitoring enrollment of a user via a user device; extracting, from the user device, unique device identification (Device ID); generating an anonymized digital identification (Digital ID) based on one or more of the Device ID and the PII; associating the Digital ID with the User ID; detecting, via a Digital Identity Network (DIN) in communication with a plurality of website application programming interfaces (APIs) executing on a corresponding plurality of websites, an identity-related event corresponding to the Digital ID; determining, using a machine learning model in communication with the one or more processors, whether the identity-related event meets one or more threshold criteria; generating an alert responsive to the threshold criteria being met by the identity-related event; and transmitting the alert.

In an another example implementation, a computer-implemented method is provided that includes receiving user identification (User ID) and associated personal identification information (PII) responsive to initiation of identity monitoring enrollment of a user via a user device; extracting, from the user device, unique device identification (Device ID); generating an anonymized digital identification (Digital ID) based on one or more of the Device ID and the PII; associating the Digital ID with the User ID; detecting, via a Digital Identity Network (DIN) in communication with a plurality of website application programming interfaces (APIs) executing on a corresponding plurality of websites, an identity-related event corresponding to the Digital ID; determining, using a machine learning model in communication with the one or more processors, whether the identity-related event meets one or more threshold criteria; generating an alert responsive to the threshold criteria being met by the identity-related event; and transmitting the alert.

According to another example implementation, computer-readable media is provided. The computer-readable media includes computer-executable instructions that, when executed by one or more processors, cause the one or more processors to perform a method of: receiving user identification (User ID) and associated personal identification information (PII) responsive to initiation of identity monitoring enrollment of a user via a user device; extracting, from the user device, unique device identification (Device ID); generating an anonymized digital identification (Digital ID) based on one or more of the Device ID and the PII; associating the Digital ID with the User ID; detecting, via a Digital Identity Network (DIN) in communication with a plurality of website application programming interfaces (APIs) executing on a corresponding plurality of websites, an identity-related event corresponding to the Digital ID; determining, using a machine learning model in communication with the one or more processors, whether the identity-related event meets one or more threshold criteria; generating an alert responsive to the threshold criteria being met by the identity-related event; and transmitting the alert.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale, and wherein.

DETAILED DESCRIPTION

Figure 1:
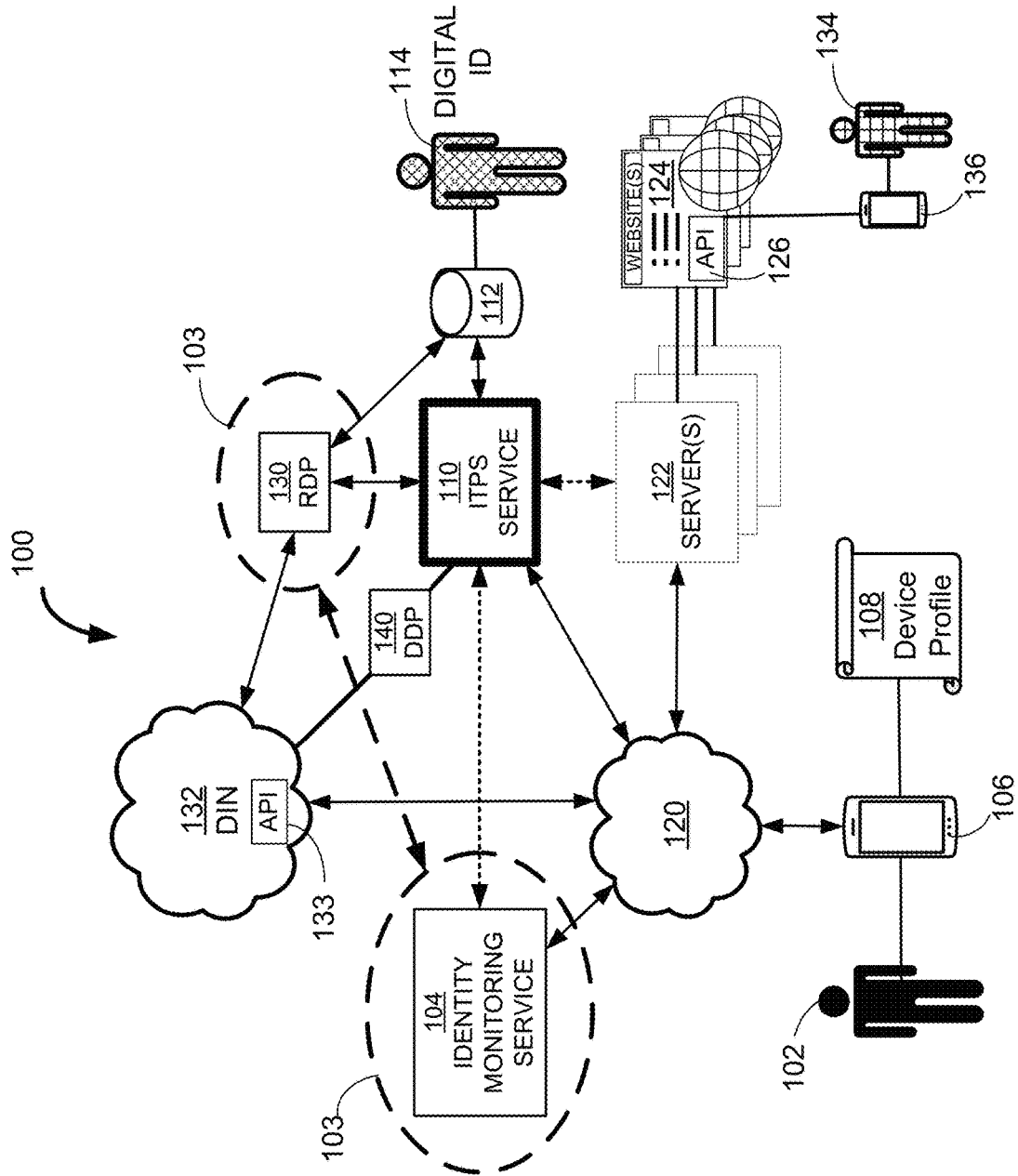
FIG. 1 is a block diagram of an illustrative Digital Identity Network Alert system 100 for providing alerts based on detected activities indicative of potential fraudulent use of a user's identity, according to an example implementation of the disclosed technology.

Various example embodiments of the disclosed technology now will be described more fully hereinafter with reference to the accompanying drawings, in which some, but not all embodiments of the disclosure are shown. This technology may, however, be embodied in many different forms and should not be construed as limited to the implementations set forth herein; rather, these implementations are provided so that this disclosure will be thorough and complete, and will convey the scope of the disclosed technology to those skilled in the art.

The disclosed technology may be utilized to monitor online activities and provide alerts responsive to the detection of potential or actual fraudulent online activity related to a user while protecting the user's sensitive personal data. Certain implementations of the disclosed technology may be utilized by an identity monitoring service, for example, to monitor online activities and provide timely alerts to associated users without creating privacy issues. As discussed in U.S. Pat. No. 10,764,297, which is incorporated herein by reference as if presented in full, a unique digital identification (Digital ID), for example, may be created for each user via anonymized persona identifiers, which can include alphanumeric identifiers that represent the user and all known attributes connected to the user's identity.

In certain exemplary implementations, one or more alerts may be provided responsive to detected online activity that corresponds to the user's Digital ID, for example, via a web site monitoring application programming interface (API) installed on an enrolled business webserver. The website monitoring API, for example can capture online transaction information that can include, but is not limited to: details about the user device; the user's location; the type of connection used for the transaction; the user's email address; the user transaction volume; how much time the user spends on a webpage; etc. Over multiple transactions, this information may be utilized to build the unique Digital ID for that user. The Digital ID may represent a unique amalgamation of details the users create as they conduct online transactions and activity. In certain exemplary implementations, each Digital ID may evolve into a genuine global digital identity over time by leveraging the complex, networked interrelationships between every piece of information gathered in each transaction.

According to certain exemplary implementations of the disclosed technology, the Digital ID may be created using an algorithm that examines relationships between select entities in real-time and may use weighted sums in the calculation. In certain exemplary implementations, a confidence score may be generated to indicate how closely the entities in the current transaction match the entities of the Digital ID assigned to that transaction.

According to certain exemplary implementations, personally identifiable information (PII) associated with a user may be utilized to generate the user's Digital ID. The Digital ID may be generated using PII having attributes such as usernames, email addresses, phone numbers ship-to addresses, payment card information, IP addresses, device profiles, online activities, transactions, etc. However, the PII may be secured by one or more of: encryption, indirect use of the PII by the generated Digital ID, and utilization of a Digital Identity Network (DIN), which does not store PII. The attributes, and the relationships between these attributes, may be amassed through a DIN, which can process millions of daily digital transactions, from tens of thousands of websites and mobile apps around the world.

FIG. 1 is a block diagram depicting an illustrative Digital Identity Network Alert system 100 configured to provide alerts responsive to one or more detected activities indicative of potential or actual fraudulent use of an enrolled user's identity information.

As a first step, a user 102 may initiate a request for enrollment with an identity monitoring service 104. During the enrollment process, the user 102 may utilize their own user device 106 to input their basic identity information, such as name, e-mail address, phone number, physical address, etc., which may be collectively considered to be part of the user's PII 103 that can also include additional "sensitive" personal information such as bank account information, Social Security number, driver's license number, passport number, etc.

The user device 106 may transmit the entered information to the identity monitoring service 104, for example, via a wide-area network such as the Internet 120. Since identity information entered by the user 102 may comprise sensitive PII 103, it may be transmitted in an encrypted form over secure connections. For example, the widely used TCP/IP communication protocol includes security protocols built on the secure socket layer (SSL) protocol to allow secure data transfer using encrypted data. SSL may be utilized by the system 100 to provide encryption, source authentication, and data integrity as a means for protecting the PII 103 and/or any additional required enrollment information exchanged between the user device 106 and the Identity Monitoring Service 104 servers.

In certain exemplary implementations, the enrollment information and/or any additional PII 103 gathered during enrollment may correspond to authentication "knowledge" factors that can correspond to (or be used to verify) something that the user 102 knows. Such information may easily be provided by the authentic user 102 but could require a perpetrator of identity fraud to perform spoofing, phishing, hacking, etc., to obtain such information. In some implementations, the enrollment information gathered from the user 102 may be utilized to independently obtain additional PII 103 information related the user 102 (for example, from one or more independent sources) and/or to independently verify the enrollment information provided by the user 102.

As depicted by the dashed ovals around the Identity Monitoring Service 104 and the Risk Defense Platform 130 of FIG. 1, the PII 103 related to the user 102 may be stored by the Identity Monitoring Service 104 and communicated only to a Risk Defense Platform 130, for which a Digital ID 114 representative of the user 102 may be generated without requiring the PII 103 to be shared or stored elsewhere on the system 100. By sequestering the PII 103, generating a representative Digital ID 114, and associating the Digital ID 114 with the User ID, the Digital Identity Network 132 may monitor activity on various business servers 122 and associated webpages 124 (via an installed website monitoring API 126) without requiring any PII 103 to be further transmitted elsewhere in this process, thus limiting or eliminating any related privacy security issues that could result from the transmission or unintended exposure of the PII 103.

Also, during the enrollment process with the Identity Monitoring Service 104, the user device 106 may be assessed to produce a device profile 108, which may serve as an additional security layer in that it may be used to verify something that the user 102 has in their possession. The device profile 108 can be based on (or include) user device 106 information such as current cellular service provider, media files, capacity, system information, model number, serial number, Wi-Fi address, Bluetooth address, IMEI number, ICCID number, firmware version, installed drivers, installed fonts, etc.

In certain exemplary implementations, the assessment of the user device 106 may be performed via a Javascript attribute query API 133 integrated into the DIN 132. In other exemplary implementations, the assessment of the user device 106 may be performed via a Javascript device assessment API (not shown) integrated on a website of the Identity Monitoring Service 104. For new users 102, the assessment process of the user device 106 may be performed during new account creation. For existing users, the assessment process of the user device 106 may be done through a separate registration process. In certain example implementations the device assessment API and/or the attribute query API 133 may request and receive a policy from the Identity Theft Protection Service 110 (ITPS). This policy may set global trust tags specific to the ITPS 110 product that contain a unique customer identifier specific to the Identity Monitoring Service 104. This unique customer identifier may be used as a means of correlating data when an actual or potential identity theft situation occurs and is detected. In certain exemplary implementations, additional policies relating to actions such as unenroll (trust tag remove in the policy) or update (trust tag remove+trust tag set in the policy) may be utilized, as appropriate, by the Identity Monitoring Service 104.

During (or after) the assessment of the user device 106, all or part of the device profile 108 information may be transmitted to the Identity Theft Protection Service 110 (ITPS), which as will be discussed below, can be utilized together with a generated Digital ID 114 to monitor and detect various online activities related to the user 102, such as new account openings, change of address requests, loan applications, social media activities, order transactions, payment transactions, account logins, etc.

The enrollment process may include the creation of an account for the user 102 by the Identity Monitoring Service 104. Accordingly, a unique User ID comprising an alphanumeric string, for example, may be associated with the enrolled user 102. This User ID may be transmitted by the Identity Monitoring Service 104 to the ITPS 110. The ITPS 110 may utilize the User ID for association with a generated Digital ID 114, and the User ID may be used to identify the associated user 102 when alerts are communicated back to the Identity Monitoring Service 102 upon detection via the Digital Identity Network (DIN) 132 of an online event related to the user 102, which will be further discussed below. In certain exemplary implementations, the User ID utilized by the system 100 can differ from a username that the user 102 utilizes to login to the Identity Monitoring Service 104.

As depicted in FIG. 1, the DIN 132 can communicate with servers 122 corresponding to a variety of businesses and/or governmental agencies that provide online interactions with their customers 134 via a website monitoring API 126 integrated into respective websites 124. The website monitoring API 126 may be configured to communicate certain identifying information about the customer 134 and/or the customer's device 136 to the DIN 132 responsive to online activities (account openings, transactions, etc.,) conducted via the website 124. In response, and in certain exemplary implementations, the DIN 132 may communicate this information to the ITPS 110, which may check for correlation with any of the previously generated Digital IDs 114, which may correspond to enrolled users 102 and/or user devices 106 for which a device profile 108 was obtained.

In certain implementations, an alert identifying the User ID may be sent to the Identity Monitoring Service 104 when certain events occur that are indicative of possible fraudulent use of an enrolled user's 102 identity information, such as (but not limited to) new account openings, change of address requests, loan applications, social media activities, order transactions, payment transactions, account logins, etc. Accordingly, the alerts can provide timely information for the Identity Monitoring Service 104 to stem identity theft activities and prevent further related damage. In some implementations, the alerts of the (potentially suspicious) activity may also be provided directly to enrolled users 102 (via their user device 106, for example) so that the enrolled user 102 may indicate that the alert corresponds to a legitimate use of their identity.

In accordance with certain exemplary implementations of the disclosed technology, when an enrolled user 102 is also the customer 134 who is accessing a business website 124 with a device 136 that has been previously associated with the user's 102 Digital ID 114, the system may not generate an alert. However, in some instances, if the device 136 location information differs from a region of the enrolled user 102 residence (i.e., a different country, or a region known to correspond to high crime rates), the alert may be generated. In certain implementations, when an account login is detected at a first location, then another event using the same login information is detected at second location exceed a threshold distance from the first location for a given period, an alert may be generated. In accordance with certain exemplary implementations of the disclosed technology, when an enrolled user 102 uses a device 136 that is either new or that differs from an enrolled device 106 (for which the device profile 108 is known), an alert may be generated.

When an alert is generated, the details of the event that generated the alert may be sent to the RDP 130 and a custom alert may then be generated through the ITPS 110 and sent to the Identity Monitoring Service 104, which may then use this alert to notify their enrolled user 102 of the event that took place associated with their identity.

In accordance with certain exemplary implementations of the disclosed technology, the ITPS 110 may store the Digital ID 114 together with the User ID in a database 112. However, the PII 103 gathered or derived at the time of enrollment may not be stored in the database 112, thus effectively anonymizing the Digital ID 114. With the generated Digital ID 114 (that can be indirectly related to the PII 103 at the RDP 130), the system 100 can monitor for activities across the entire DIN 132. In certain exemplary implementations, the RDP 130 may map or associate Digital IDs 114 with corresponding enrolled users 102. When a monitored digital identity is seen in a transaction on any of the websites 124 in communication with the DIN 132, an alert can be generated. In accordance with certain exemplary implementations of the disclosed technology, the RDP 130 may pick up these alerts using the User ID provided by the Identity Monitoring Company 104. In certain exemplary implementations, the RDP 130 may generate an alert for the enrolled user's 102 of the Identity Monitoring Company 104.

In certain implementations, the DIN 132 may track transactions via the website monitoring API's 126 installed on partner websites 124 and any irregular or anomalous transaction data may be identified and captured, for example, to determine if the transaction would warrant an alert. In certain exemplary implementations (and as will be further discussed below with reference to FIG. 4), a message bus may be utilized as a communication system between the DIN 132 and the ITPS 110 to provide mutually interacting software applications in a service-oriented architecture. In certain exemplary implementations, a global policy may be utilized to call certain logic functions in the ITPS 110 for every detected transaction event. Accordingly, the logic may check for identity-theft-like anomalies. The logic functions may be flexible in the sense that new logic may be added at-will. Those having skill in the art may recognize that flexibility in the logic functions may be implemented via Project Portfolio Management, which may be used to gauge projects and associated tacks, for example, to enable features for customers.

In certain exemplary implementations, reason codes and associated transaction data may be placed on a message bus and pushed to a broker upon detection of an anomalous event. In certain exemplary implementations, the message broker may cache messages in memory, providing the ITPS 110 to catch-up and/or keep current with the decisioning and/or alerts. In certain exemplary implementations, the message payload may include a unique identifier and one or more triggered reason codes. The unique identifier, for example, may be generated for a given User ID and may be correlated to a specific user 102. The reason codes may identify the type of anomaly that caused the alert to be initiated. For example, one reason code may signify the detection of multiple user devices associated with a user's email account within a predetermined time period; another reason code may signify detection of an actual or attempted user account login via a virtual machine; another reason code may signify actual or attempted user account access using a device that was not previously profiled; another reason code may signify an unusual spending pattern; etc. In some implementations, the payload may also include identifying information regarding the industry of the customer whose event triggered the reason code.

In accordance with certain exemplary implementations of the disclosed technology, the IDPS 110 may include a message subscriber hooked into the shared broker, which may be configured to ingest the message payload from a policy engine and populate an events database. In some implementations, the database may be a first-in-first-out (FIFO) stack containing the reason codes.

In certain exemplary implementations, the Identity Monitoring Service 104 may request alerts ("get alerts") from the ITPS 110, which in response, my return all of the generated alerts from the ITPS 110 and the associated database. In other implementations, the system 100 may be push-based (i.e. a consumer/producer model) to avoid continuous polling of this endpoint.

In accordance with certain exemplary implementations of the disclosed technology, a real-time Dynamic Decision Platform (DDP) 140 may be in communication with one or more of the ITPS 110 and the DIN 132, and may include a real-time decisioning, for example, to determine if a transaction would be considered anomalous, to determine whether such transaction would warrant an alert, and/or to determine a risk level or category associated with the transaction. In certain exemplary implementations, the DDP 140 may incorporate and/or utilize behavioral analytics, machine learning, case management, and and/or integration capabilities to make accurate and timely trust/risk decisions. The behavioral analytics utilized by the DDP 140 may include smart rules to enable better understanding of legitimate user behavior and to more accurately detect genuine fraud. The machine learning utilized by the DDP 140 may integrate digital identity intelligence with the (above-referenced) smart rules to produce optimized models with fewer false positives. In certain exemplary implementations, a workflow and process orchestration may be utilized to integrate external data sources into the DDP 140. In certain exemplary implementations, pre-integrated third-party services may be accessed for transactions that require additional assurance and/or exception handling. In certain exemplary implementations, case management may be utilized to enable continuous optimization of authentication and fraud decisions by monitoring, updating and isolating transactions that require additional review. Accordingly, the disclosed technology provides certain technical solutions to the practical application of identity theft detection and/or prevention and provides an improved process and system to assess and provide alerts for increasingly complex transactions caseloads with shrinking resources.

Figure 2:
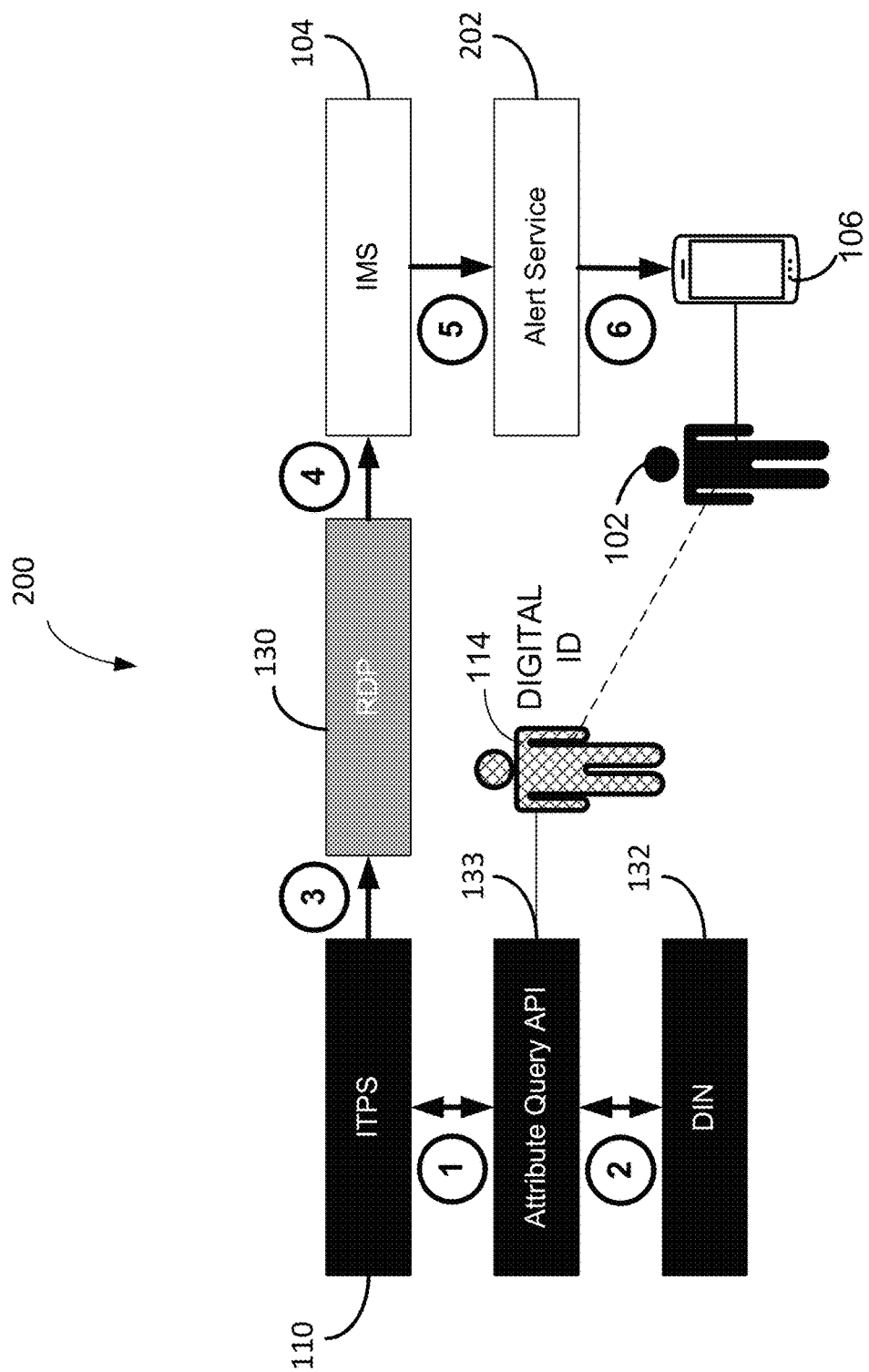
FIG. 2 illustrates an example process 200 that may be utilized by the Digital Identity Network Alert system 100 of FIG. 1 for detecting transactions indicative of potential or actual identity-theft and providing associated alerts, according to an example implementation of the disclosed technology.

FIG. 2 illustrates an example process 200 for detecting transactions indicative of potential or actual identity-theft and for providing associated alerts, according to an example implementation of the disclosed technology. In certain exemplary implementations, the Digital Identity Network Alert system 100 as discussed above with respect to FIG. 1 may be utilized for part or all of the process 200. The process 200 may commence after enrollment of the user 102, which may include device profiling of the user device 106, and the creation of the Digital ID 114, as discussed previously.

As a first step of the process 200, the ITPS 110 may call an attribute query API 133, for example, to execute a policy with alert criteria. In certain exemplary implementations, the attribute query API 133 may selectively commit the Digital ID 114 to the DIN 132. In certain exemplary implementations, the alert criteria may include location-based criteria. For example, when an account login is detected at a first location, then another event using the same login information is detected at second location exceed a threshold distance from the first location for a given period, an alert may be generated. In certain exemplary implementations, the alert criteria may include unusual spending habits, and when an unusual pattern of spending is detected related to the Digital ID 114, an alert may be generated. In certain exemplary implementations, the alert criteria may include certain login activities in which alerts may be generated upon detection of a high login velocity and/or exceeding a threshold number of password reset requests.

In a second step of the process 200, the attribute query API 133 may fetch results from the DIN 132, which may be completely anonymized so that the Digital ID 114 may be associated, for example, with a User ID provided by the Identity Monitoring Service 104, but not with the PII. In certain exemplary implementations, the fetched results may be sent back to the ITPS 110 via response by the attribute query API 133.

In a third step of the process 200, the ITPS 110 may notify the RDP 130 that alert criteria is met for a Digital ID 114.

In a fourth step of the process 200, the RDP 130 may notify the Identity Monitoring Service 104 backend of the alert, associated context, and sufficient information to identify the user 102 (such as the User ID) without requiring any PII to be used in this identification process. This privacy feature, in which the DIN 132 may be completely anonymized, allows the DIN 132 to monitor websites 124 via the website APIs 126 for activity related to the Digital ID 114. Once a transaction related to a Digital ID 114 is detected, alert data may be sent via the website API 126 to the RDP 130, which may store PII that is associated with the User ID provided by the Identity monitoring company. In certain exemplary implementations, the alert including a vendor ID and User ID may be sent to the Identity Monitoring Service 104.

In a fifth step of the process 200, the Identity Monitoring Service 104 backend may transfer the alert (and associated context) to an Alert Service 202, which may alert the user 102 whenever an abnormal transaction or related activity is detected that could be indicative of identity theft-related activity.

In certain exemplary implementations, once the user 102 receives the alert, the user 102 may respond to confirm that the alert corresponds to legitimate activity or not. Such feedback may be used by the machine learning model and/or associated behavioral analytics utilized by the DDP 140 to further refine understanding of legitimate user behavior and to more accurately detect genuine fraud. If the detected activity is flagged by the user 102 as unknown, non-legitimate, or otherwise fraudulent in appearance, the Identity Monitoring Service 104 (and/or the user 102) may intervene with the corresponding business, for example, to terminate the associated transaction, or otherwise stop the fraudulent activity.

Figure 3:
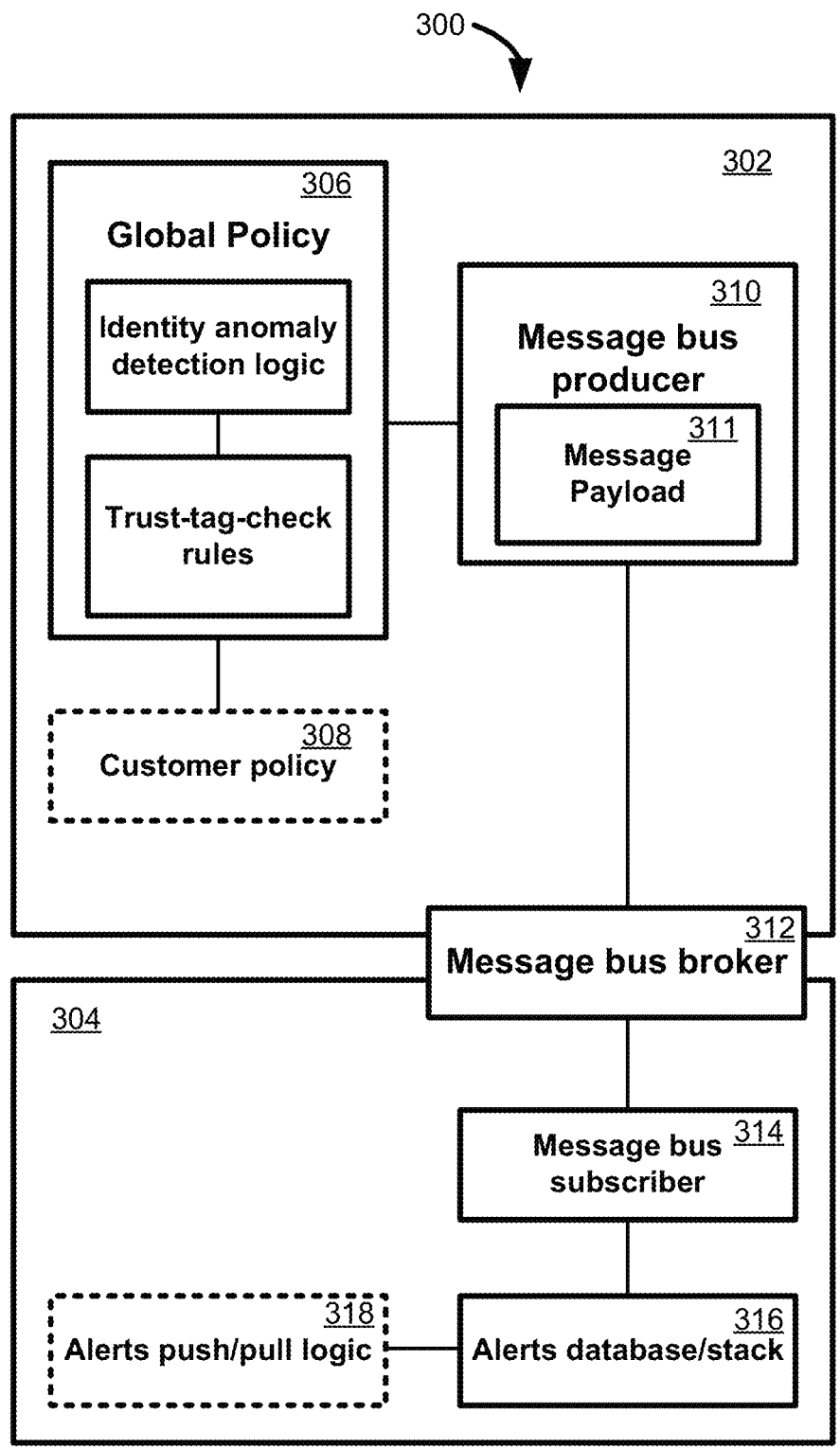
FIG. 3 is a block diagram of an example alert system infrastructure 300 in which a message bus broker may be utilized, according to an example implementation of the disclosed technology.

FIG. 3 is a block diagram of an example alert system infrastructure 300 in which a message bus broker 312 may be utilized for message communications between a first node 302 and a second node 304 of a Digital Identity Network Alert system (such as system 100 as discussed above with reference to FIG. 1). In accordance with certain exemplary implementations of the disclosed technology, the first node 302 may be the DIN 132 and the second node 304 may be the RDP 130, the ITPS 110, or the DDP 140 as illustrated in FIG. 1. In other exemplary implementations, the first node 302 may be the ITPS 110 and the second node 304 may be the RDP 130, or the Identity Monitoring Service 104, as illustrated in FIG. 1.

As an example where the DIN 132 is the first node 302 and the ITPS 110 is the second node 304, the ITPS 110 may include a message bus subscriber 312 hooked into the shared message bus broker 312, which may be configured to ingest the message payload 311 from message bus producer 310 associated with the first node 302 (i.e., the DIN 132 in this case). In certain exemplary implementations, a global policy 306 may utilize identity anomaly detection logic and/or trust-tag-check rules as gatekeepers for detected transactions or events, and such gatekeepers may be utilized to evaluate the transaction or event and initiate or suppress a corresponding alert. In certain exemplary implementations, a customer policy 308 (for example, as associated with the Identity Monitoring Service 104) may further refine or revise requirements of the detection logic and/or rules of the global policy 306.

In certain exemplary implementations, and as briefly discussed above, certain reason codes and associated transaction data may be used to form the message payload 311, and the message payload 311 may be placed on a message bus via the message bus producer 310. In certain exemplary implementations, the message may be pushed to the message bus broker 312 upon detection (and gatekeeping) of an anomalous event. In certain exemplary implementations, the message bus broker 312 may cache messages in memory, allowing second node 304 (e.g., the ITPS 110 in this case) to catch-up and/or keep current with the decisioning and/or alerts. In certain exemplary implementations, the message payload 311 may include a unique identifier and one or more triggered reason codes. The unique identifier, for example, may be generated for a given User ID and may be correlated to a specific user 102. The reason codes may identify the type of anomaly that caused the alert to be initiated. For example, one reason code may signify the detection of multiple user devices associated with a user's email account within a predetermined time period; another reason code may signify detection of an actual or attempted user account login via a virtual machine; another reason code may signify actual or attempted user account access using a device that was not previously profiled; another reason code may signify an unusual spending pattern; etc. In some implementations, the message payload 311 may also include identifying information regarding the industry of the customer whose event triggered the reason code.

In accordance with certain exemplary implementations of the disclosed technology, the second node 304 (e.g., the ITPS 110 in this example case) may include a message bus subscriber 314 in communication with the shared message bus broker 312, which may be configured to ingest the message payload 311 a populate an alerts database or stack 316 for transmission. In certain exemplary implementations, the database 316 may be a first-in-first-out (FIFO) stack. In certain exemplary implementations, alert push and/or pull logic 318 may be utilized to control delivery of the associated alerts. For example, in one embodiment, the Identity Monitoring Service 104 may specify pulling of their stacked alerts in a periodic fashion, such as every 10 minutes. In another embodiment, the Identity Monitoring Service 104 may wish to have any alerts pushed to them as they are generated to avoid continuous polling. In another embodiment, the Identity Monitoring Service 104 may request alerts ("get alerts") from the ITPS 110, which in response, may return all the generated alerts from the ITPS 110 and the associated database 316.

Figure 4:
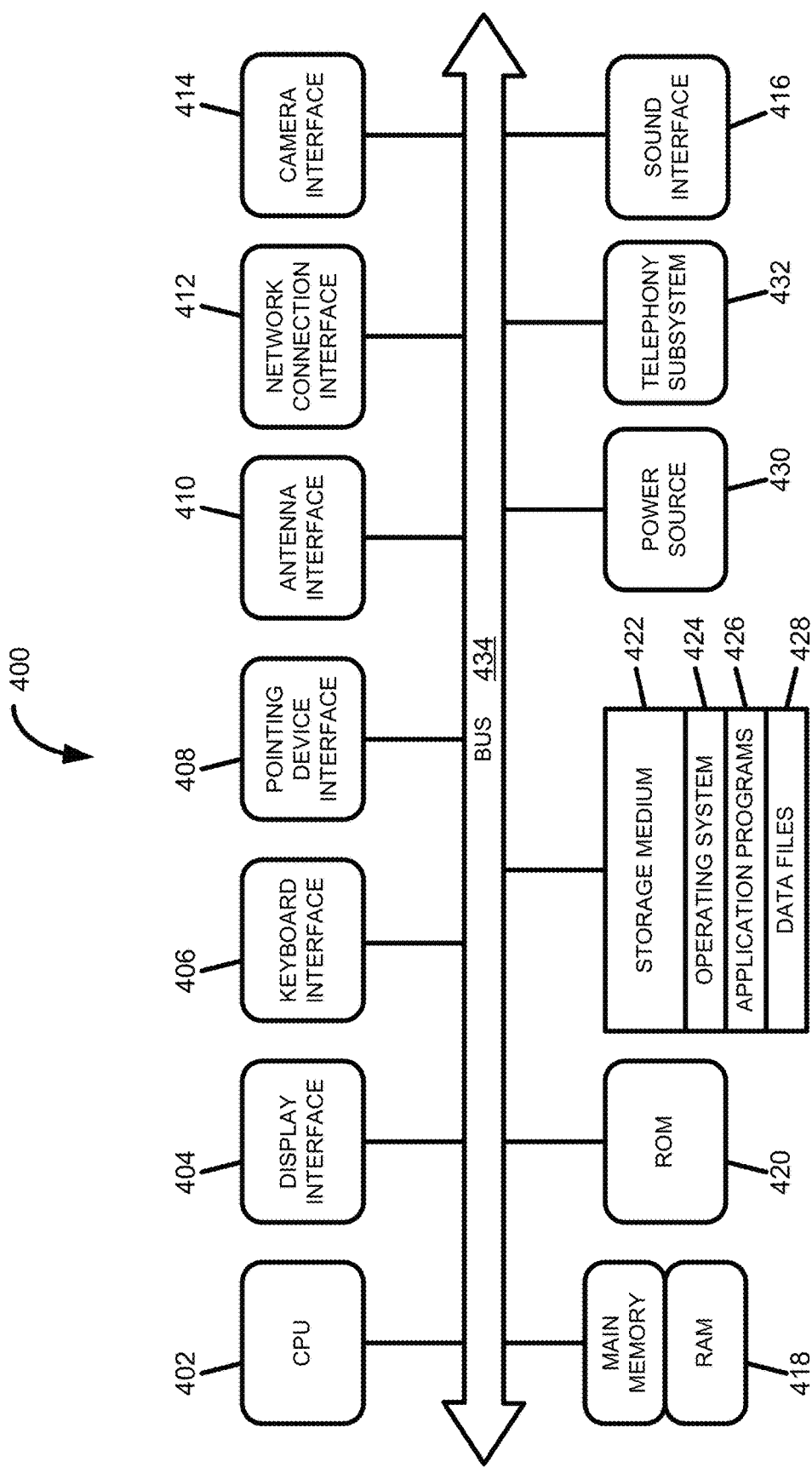
FIG. 4 is a block diagram of an example computing device 400, according to an example implementation of the disclosed technology.

FIG. 4 is a block diagram of a computing device 400, according to an example implementation of the disclosed technology. In certain example implementations, the computing device 400 may be embodied as the user device 106, as shown in FIG. 1. In certain example implementations, the computing device 400 may be embodied as the server(s) 122, as shown in FIG. 1. In certain example implementations, the computing device 400 may be embodied as the first node 302 and/or the second node 304 as shown in FIG. 3.

The computing device 400 of FIG. 4 includes a central processing unit (CPU) 402, where computer instructions are processed; a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display that is not necessarily physically connected to the computing device. For example, a desktop monitor may be utilized for mirroring graphics and other information that is presented on the computing device 400. In certain example implementations, the display interface 404 may wirelessly communicate, for example, via a Wi-Fi channel or other available network connection interface 412 to an external/remote display.

In an example implementation, the network connection interface 412 may be configured as a communication interface, for example, to provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 400 may include a keyboard interface 406 that provides a communication interface to a keyboard. In one example implementation, the computing device 400 may include a pointing device and/or touch screen interface 408. According to certain example implementations of the disclosed technology, the pointing device and/or touch screen interface 408 may provide a communication interface to various devices such as a pointing device, a touch screen, a depth camera, etc. which may or may not be associated with a display.

The computing device 400 may be configured to use an input device via one or more of input/output interfaces (for example, the keyboard interface 406, the display interface 404, the touch screen interface 408, network connection interface 412, camera interface 414, sound interface 416, etc.,) to allow a user to capture information into the computing device 400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 400 or may be a separate device.

Example implementations of the computing device 400 may include an antenna interface 410 that provides a communication interface to an antenna; a network connection interface 412 that provides a communication interface to a network. In certain implementations, a camera interface 414 is provided for capturing digital images, for example, from a camera. In certain implementations, a sound interface 416 is provided as a communication interface for converting sound into electrical signals using a microphone and for converting electrical signals into sound using a speaker. According to example implementations, a random-access memory (RAM) 418 is provided, where computer instructions and data may be stored in a volatile memory device for processing by the CPU 402.

According to an example implementation, the computing device 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device 400 includes a storage medium 422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 424, application programs 426 (including, for example, a web browser application, an invoice extraction module, etc.) and data files 428 are stored. According to an example implementation, the computing device 400 includes a power source 430 that provides an appropriate alternating current (AC) or direct current (DC) to power components. According to an example implementation, the computing device 400 may include and a telephony subsystem 432 that allows the device 400 to transmit and receive sound over a telephone network. The constituent devices and the CPU 402 communicate with each other over a bus 434.

In accordance with an example implementation, the CPU 402 has appropriate structure to be a computer processor. In one arrangement, the computer CPU 402 may include more than one processing unit. The RAM 418 interfaces with the computer bus 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 in order to execute software programs. Data may be stored in the RAM 418, where the data may be accessed by the computer CPU 402 during execution. In one example configuration, the device 400 includes at least 128 MB of RAM, and 256 MB of flash memory.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like (such as the processes described in FIGS. 1-5) that are stored on removable and non-removable memory media, to off-load data from the device 400 or to upload data onto the device 400. A computer program product, such as one utilizing a communication system may be tangibly embodied in storage medium 422, which may comprise a machine-readable storage medium.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra-mobile PCs (UMPCs), etc.

Figure 5:
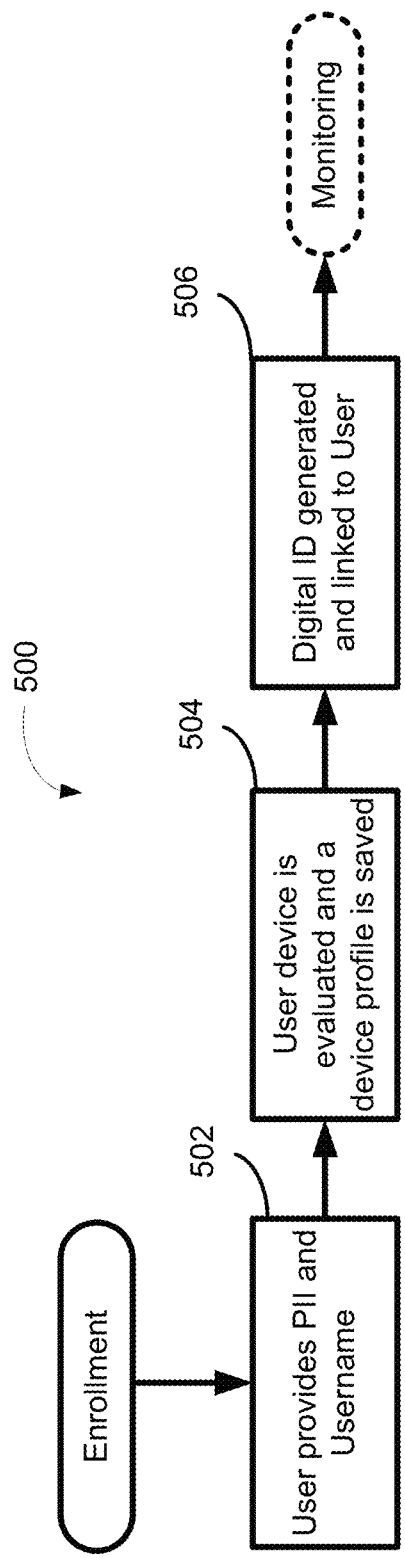
FIG. 5 is an illustrative flow diagram 500 of a process for user and device enrollment, according to an example implementation of the disclosed technology.

FIG. 5 is an illustrative flow diagram of a process 500 for user and device enrollment according to an example implementation of the disclosed technology. Certain elements and implementations of the enrollment process 500 may correspond to those discussed above with respect to FIG. 1. In block 502 of the enrollment process 500, the user may enroll to establish an account with the Identity Monitoring Service by establishing a username and by entering certain personally identifiable information (PII), which may include (but is not limited to) typical PII such as full name, mailing address, e-mail address, phone number, date of birth, etc. In some implementations, the Identity Monitoring Company may request or require additional PII, such as Social Security number, city of birth, credit card number, etc. In some implementations, the PII entered may include "sensitive" information that would only be used for positively identifying or authenticating the user. In certain implementations, data provided by the user may be encrypted, for example, by a secure socket layer (SSL) protocol to ensure source authentication and data integrity as a means for protecting the PII and/or any additional required enrollment information exchanged between the user device, the Identity Monitoring Service servers, and/or affiliated service (such as the Identity Theft Protection Service 110 as discussed with respect to FIG. 1).

In block 504 of the enrollment process 500, the user device (i.e., the computing device that is utilized by the user for the enrollment process 500) may be evaluated and the user device profile may be generated, saved, and associated with the user. In certain implementations, the device may be evaluated and profiled by a service affiliated, but independent of the Identity Monitoring Service (for example, by the Identity Theft Protection Service 110 as discussed with respect to FIG. 1). The device profile can be based on (or include) user device information such as current cellular service provider, media files, capacity, system information, model number, serial number, Wi-Fi address, Bluetooth address, IMEI number, ICCID number, firmware version, installed drivers, installed fonts, etc.

In block 506 of the enrollment process 500, a Digital ID may be generated and linked with the user. In certain exemplary implementations, the device profile may also be linked to the user and/or the Digital ID, for example, to monitor and detect various online activities related to the user such as new account openings, transactions, change of address requests, loan applications, social media activities, etc. As may be appreciated by those having skill in the art, and as previously discussed herein, the Digital ID may be anonymized (and indirectly associated with the user) to eliminate privacy issues and/or exposure of the user's personally identifiable information.

Figure 6:
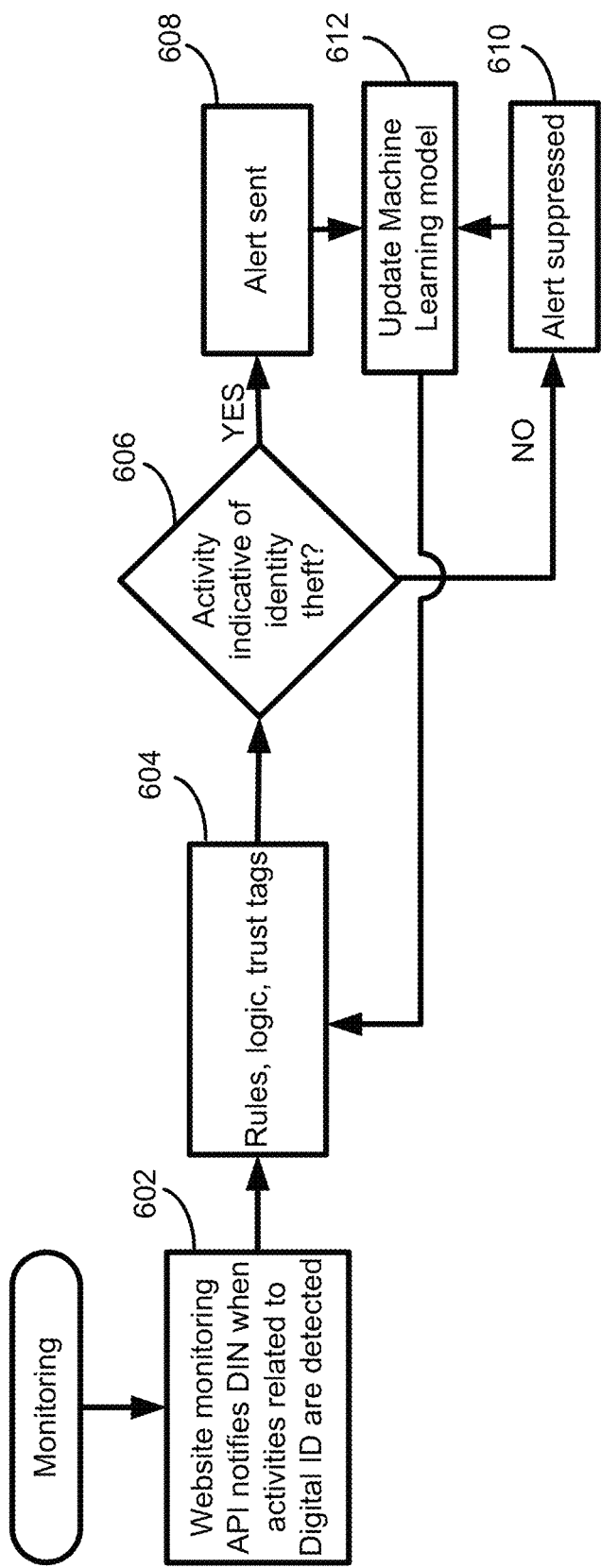
FIG. 6 is an illustrative flow diagram 600 of a process for event monitoring, alert gatekeeping, and refinement, according to an example implementation of the disclosed technology.

FIG. 6 is an illustrative flow diagram of a process 600 for event monitoring, alert gatekeeping, and (optional) refinement, according to an example implementation of the disclosed technology. The process 600 may commence after enrollment, as discussed with respect to FIG. 5. In block 602, the process 600 may utilize an application programming interface (such as the website monitoring API 126 in communication with a Digital Identity Network and executing on an affiliated business website 124, as discussed with reference to FIG. 1) to monitor account activities (such as account openings, password resets, etc.) that may be related to a Digital ID of a user who is enrolled with the Identity Monitoring Service. Responsive to the detection of such activities, the website monitoring API 126 may communicate the detection of such activity to the Digital Identity Network (DIN).

In block 604, the process 600 may include application of one or more rules and/or logic may be applied In certain exemplary implementations, identifying information related to the associated activity (such as vendor, time, device location, specific activity, etc.) and information about the associated Digital ID may be received and/or derived by DIN for further application of rules, logic, alert gatekeeping, etc. In certain exemplary implementations, trust tags identifying trusted and/or untrusted sources, users, user devices, etc. may be checked to improve efficiency, for example, so that additional time-consuming processing using the rules and logic may be bypassed when an associated parameter is marked as trusted.

In decision block 606, the process 600 may include an evaluation of whether the detected activity is indicative of (actual or potential) identity theft. In certain implementations, this decision block 606 may utilize the rules, logic, trust tags, etc. from block 604. In block 608, an alert may be sent to the Identity Monitoring Service upon an evaluation that an event or activity is indicative of (actual or potential) identity theft. In certain exemplary implementations, such alert may be sent directly to an associated enrolled user via their profiled user device. In block 610, if the event or activity is evaluated as safe, or not indicative or actual or potential identity theft, the corresponding alert may be suppressed and not sent.

In block 612, the process 600 may utilize the decision/evaluation and any related information as input to a Machine Learning model that can be used, for example, as feedback to update or refine rules, logic, and/or trust tags in block 604. Accordingly, the process 600 may be continually refined to improve detection and identification of potentially fraudulent events, while suppressing false positives. In this respect, certain exemplary embodiments of the disclosed technology may provide an improvement in the underlying technology by improving alert processing speeds and/or improving the reliability of the alert accuracy.

Figure 7:
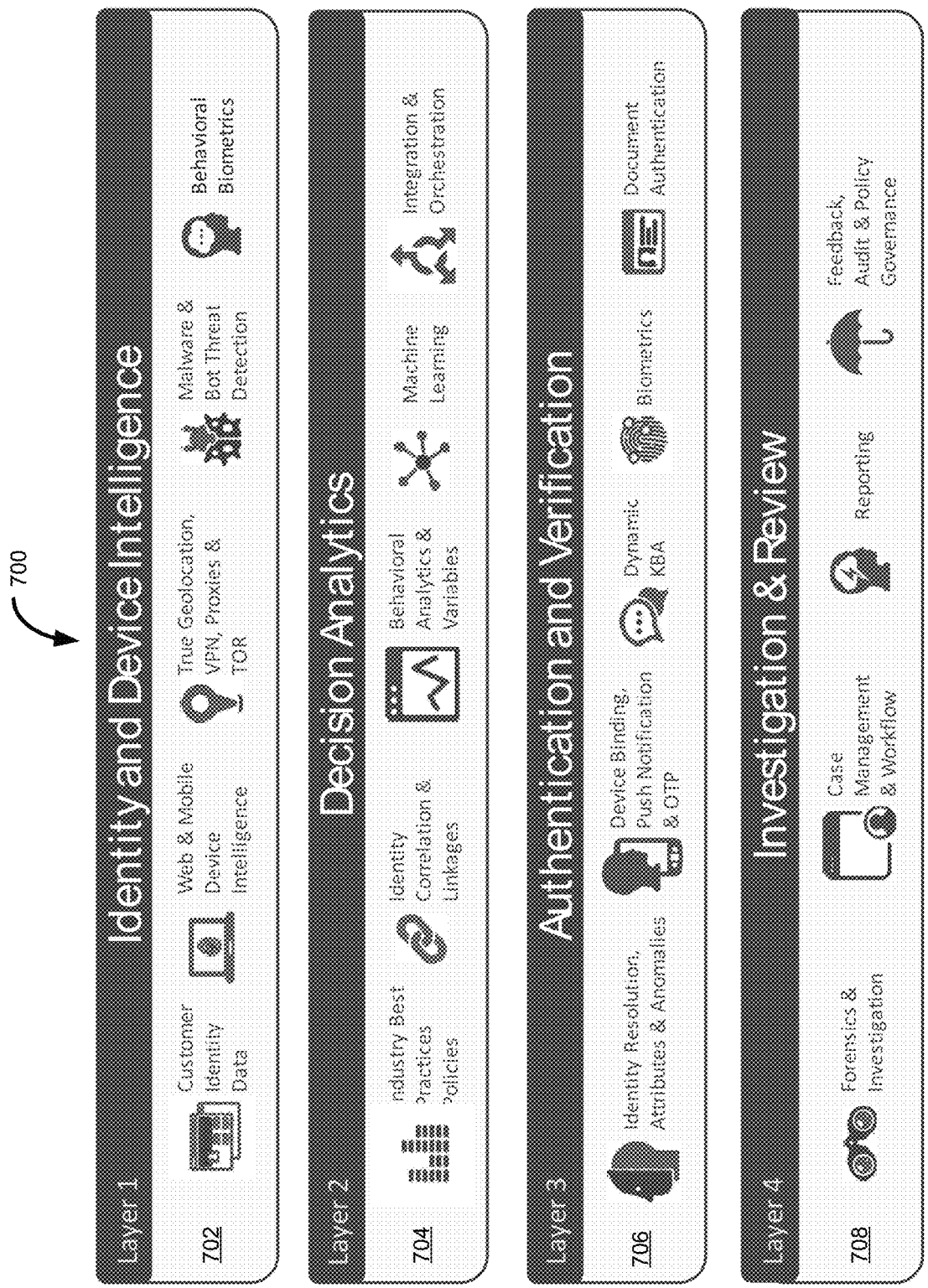
FIG. 7 illustrates the different layers of processes 700 that may be utilized in certain example implementations of the disclosed technology.

FIG. 7 illustrates the different layers of technical processes 700 that may be utilized in certain example implementations of the disclosed technology. In accordance with certain exemplary implementations of the disclosed technology, a first layer 702 may be utilized to provide identity and device intelligence to enable monitoring online activity, evaluate events, and provide appropriate alerts when irregular, suspicious, or (actual or potential) fraudulent activities or events are detected.

TABLE 1

Sources and records utilized

| Source/Record | Count (approximate) |
| --- | --- |
| Public Records | 80 billion+ |
| Data Sources | 10,000 |
| Digital attributes | 50 billion+ (added annually) |
| Mobile devices | 1.5 billion |
| Unique IP addresses | 700 million+ |
| Unique Devices Identified | 4.5 billion+ |
| Digital IDs | 1.4 billion+ |
| Unique E-mail addresses | 800 million+ |
| Unique mobile phones | 290 million+ |

Table 1 is a (partial) list of the types of records and sources (with approximate number counts) that may be utilized by the systems and methods disclosed herein. The records can include property records, bankruptcy records, criminal records, motor vehicle registration and title records, consumer names, consumer addresses, insurance claim records, business contact records, etc. Certain implementations of the disclosed technology may utilize various database with crowdsourced intelligence fed from millions daily events across thousands of customers. Certain implementations may utilize/evaluate nearly 40 billion events annually, with global coverage in 185 countries. Certain implementations may identify bots and non-human session, profile fraudsters, detect session anomalies, identify humans, and identify trusted customer behavior.

FIG. 7 also depicts a second layer 704, which may be utilized by the systems and methods disclosed herein to provide decision analytics for discerning legitimate online activity from possible fraudulent activity. For example, in the use case of password resets, it has been determined that fraudsters are much more likely to populate associated fields in a user interface using paste rather than manual keyboard entry. Certain implementations may utilize paste detection, typing speed, the use of autofill, etc. as an indicator of potentially fraudulent activity. In accordance with certain exemplary implementations of the disclosed technology, the technical processes 700 may include a third layer 706 to handle user authentication and verification. For example, a related process may include identity resolution, which may utilize multiple fields in a database to resolve and deduplicate records. The technical processes 700 may include a fourth layer 708 directed to investigation and review of results obtained via the processes 702, 704, 706 of the previous layer. Accordingly, as discussed above, feedback from this layer may be utilized to refine workflow, reporting, policy, detection accuracy, etc.

Figure 8:
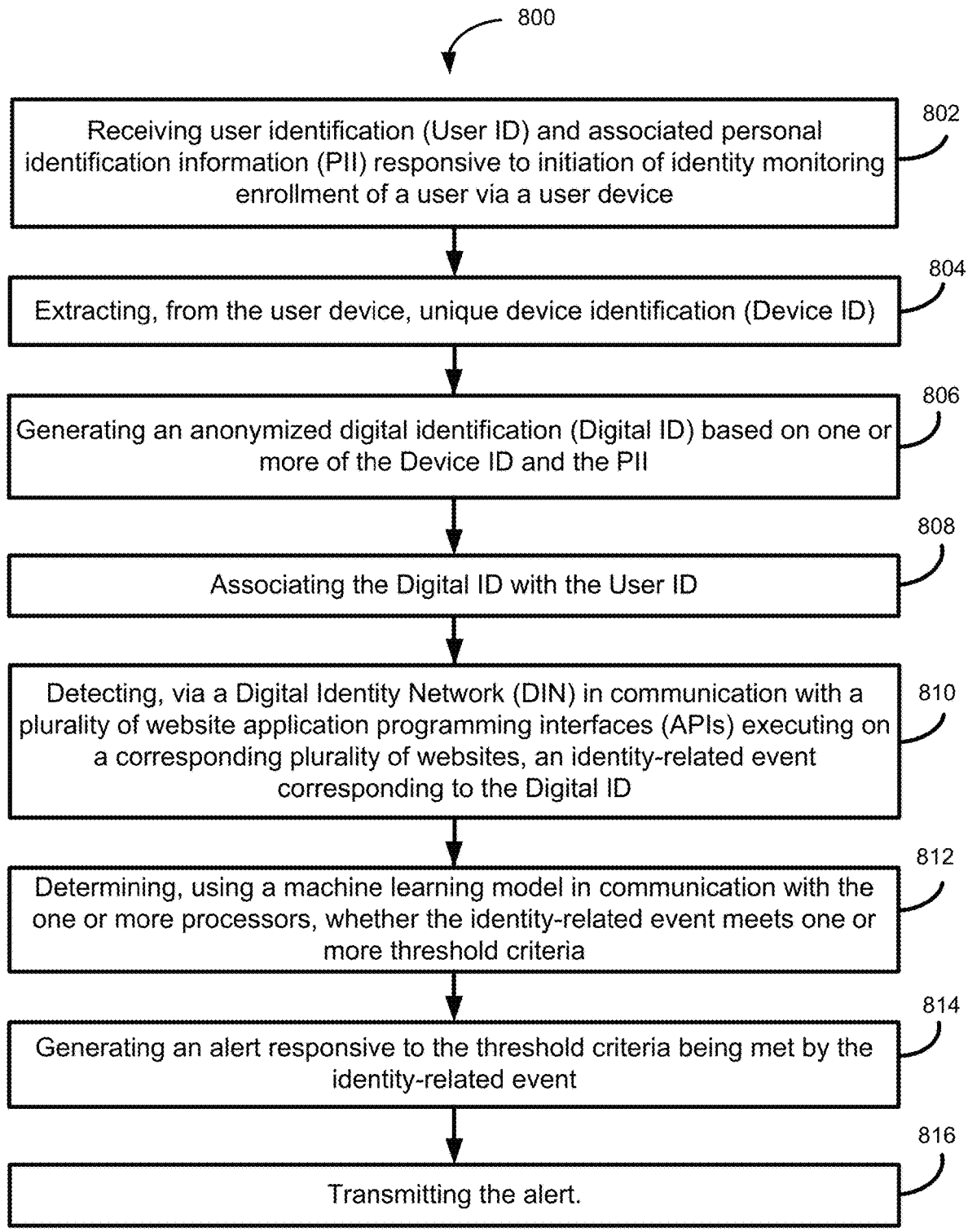
FIG. 8 is a flow diagram of a method 800, according to an example implementation of the disclosed technology.

FIG. 8 is an illustrative flow diagram of a method 800, according to an example implementation of the disclosed technology. In block 802, the method 800 includes receiving user identification (User ID) and associated personal identification information (PII) responsive to initiation of identity monitoring enrollment of a user via a user device. In block 804, the method 800 includes extracting, from the user device, unique device identification (Device ID). In block 806, the method 800 includes generating an anonymized digital identification (Digital ID) based on one or more of the Device ID and the PII. In block 808, the method 800 includes associating the Digital ID with the User ID. In block 810, the method 800 includes detecting, via a Digital Identity Network (DIN) in communication with a plurality of application programming interfaces (APIs) executing on a corresponding plurality of websites, an identity-related event corresponding to the Digital ID. In block 812, the method 800 includes determining, using a machine learning model in communication with the one or more processors, whether the identity-related event meets one or more threshold criteria. In block 814, the method 800 includes generating an alert responsive to the threshold criteria being met by the identity-related event. In block 816, the method 800 includes transmitting the alert.

In certain exemplary implementations, the alert can include one or more of the User ID and identification of the identity-related event. In certain exemplary implementations, the alert may be transmitted to an identity monitoring service associated with the enrollment of the user. In certain exemplary implementations, the alert may be sent via one or more of text and e-mail to a user associated with the User ID.

In accordance with certain exemplary implementations of the disclosed technology, the threshold criteria may be based on one or more of rules, logic, and trust tags.

In certain exemplary implementations, results of the determining whether the identity-related event meets one or more threshold criteria may be fed back to the machine learning model to refine the machine learning model.

In accordance with certain exemplary implementations of the disclosed technology, generating the Digital ID can include generating a combination of the User ID and the Device ID.

In accordance with certain exemplary implementations of the disclosed technology, the Digital Identity Network (DIN) may be in communication with a plurality of business servers that host the corresponding plurality of websites.

In certain exemplary implementations, the APIs are configured to transmit encrypted event information to the DIN.

In accordance with certain exemplary implementations of the disclosed technology, the Device ID can include one or more of: cellular service provider, media files, capacity, system information, model number, serial number, Wi-Fi address, Bluetooth address, IMEI number, ICCID number, firmware version, installed drivers, installed fonts, etc.

Certain implementations of the disclosed technology may be utilized to identify individuals and/or networks associated with certain activities based on geographical and/or social network mapping. In one example implementation, a social network for an individual may be analyzed to determine geographical locations of associates, relatives, business partners, etc., relative to certain activities. According to one example implementation, the activities may be related to incidents of identity theft. In another example implementation, the activities may be related to online purchases, for example, where goods may be shipped to a vacant (or foreclosed) address and locally monitored or controlled by a person (for retrieval of the goods) without being linked to the address.

In an example embodiment, time-dependent digital mapping of information related to a Digital ID (associated with an enrolled user) may be utilized to identify one or more probable perpetrators of crimes or individuals associated with certain activities. For example, in one embodiment, a person's time-dependent digital mapping may be analyzed for geographical proximities to locations associated with certain activities and/or geographical proximities to addresses of identity theft victims. In certain example embodiments, thresholds, weightings, etc., may be applied based on attributes of the information, and scoring may be performed to produce confidence levels that a particular entity may be involved in such activities.

In accordance with one example embodiment, a time-dependent digital mapping may be determined for every person in a given population. For example, embodiments of the disclosed technology may be utilized to determine time-dependent digital mapping for each person in the United States to determine individuals that are related in some way, including, but not limited to family, business associates, friends, past roommates, etc. In an example embodiment, locations, addresses, or regions of an activity (for example, addresses of identity theft victims) may be compared with current home and/or work addresses for the people in an individual's social network. In certain example embodiments, a distance may be calculated between such locations. According to an example embodiment, such data may be utilized to identify certain patterns, confidence values, scores, etc. In an example implementation, all members of the social network may be considered. In other example implementations, only individuals having certain connection criteria may be considered to reduce the computation complexity.

Certain embodiments of the disclosed technology may provide improved accuracy over conventional systems and techniques. For example, law enforcement departments attempting to identify perpetrators of certain fraudulent activities (such as identity theft) may utilize conventional focused analysis techniques that examine each event in isolation. The conventional techniques typically utilize high thresholds to filter the large number of events to be analyzed. In other words, because the data that must be analyzed with conventional techniques is so large, a high degree of suspicious activity may be required in order to identify individuals or entities associated with the activity. Without a high threshold, conventional techniques may have too many potentially fraudulent events to investigate. As a result, entities using conventional techniques often overlook collusion from groups that are able to stay below these high thresholds with respect to certain suspicious activities.

The systems and methods disclosed herein may be capable of efficiently leveraging readily available data to help detect individuals involved with certain activities. According to an example implementation of the disclosed technology, a large quantity of data may be grouped into smaller, distinct units or networks. In an example embodiment, seemingly low risk activity within each network may be measured to identify potentially organized groups without having to apply low thresholds to the large amounts of data as a whole.

In one example embodiment, a domain of entities may be identified for analysis. For example, data associated with a large number (perhaps hundreds of millions) of individuals may be gathered for analysis. The data may include identities of individuals, organizations, companies, etc. According to certain example embodiments of the disclosed technology, one or more types of relationships between the entities may then be collected.

In certain embodiments, a filtering mechanism may operate against the networks and may retain those networks that have outlying behavior. Such filtering may conventionally utilize graph-or network analysis, and queries/filtering of this form may utilize sub-graph matching routines or fuzzy sub-graphs matching. However, sub-graph matching routines or fuzzy-sub-graphs matching techniques may be NP-complete, and thus, impractical for analyzing large sets of data. The most notable characteristic of NP-complete problems is that no fast solution to them is known. That is, the time required to solve the problem using any currently known algorithm increases very quickly as the size of the problem grows. This means that the time required to solve even moderately sized versions of many of these problems can easily reach into the billions or trillions of years, using any amount of computing power available today. Embodiments of the disclosed technology may be utilized to determine or provide connections between entities even though the set of data analyzed may be extremely large.

In accordance with an example implementation of the disclosed technology, entities may be identified and may include people, companies, places, objects, virtual identities, etc. In an example embodiment, relationships may be formed in many ways, and with many qualities. For example, co-occurrence of values in common fields in a database may be utilized, such as the same last name. Relationships may also be formed using multiple co-occurrence of an entity with one or more other properties, such as people who have lived at two or more addresses.

Relationships may also be formed based on a high reoccurrence and/or frequency of a common relationship, according to an example embodiment. For example, records of person X sending an email to person Y greater than N times may indicate a relationship between person X and person Y. In another example embodiment, if person X sends an email to or receives an email from person Y, and within a short period of time, person Z sends an email or receives an email from person Y, then a relationship may be implied between person X and person Z.

In accordance with an example implementation of the disclosed technology, relationships between entities may comprise Boolean, weighted, directed, undirected, and/or combinations of multiple relationships. According to certain example embodiments of the disclosed technology, clustering of the entities may rely on relationships steps. In one embodiment, entities may be related by at least two different relationship types. In one embodiment, relationships for the network connection analysis may be established by examining weights or strengths of connections between entities in certain directions and conditional upon other relationships, including temporal relationships. For example, in one embodiment, the directional relationships between entities X, Y, and Z may be examined and the connection between X, Y, and Z may be followed if there is a link between Y and Z happened (in time) after the link was established between X and Y.

Many methods may be utilized to filter networks once they are identified. For example, in one embodiment, networks may be scored. In another embodiment, a threshold may be utilized to identify networks of interest. According to an example embodiment of the disclosed technology, a model may be utilized to compute a number of statistics on each network. In one embodiment, the model may be as simple as determining counts. In another embodiment, the model may detect relationships within a network, for example, entities that are related to the centroid of the network that are also related to each other. This analysis may provide a measure of cohesiveness of relationships that exist inside the network. According to an example embodiment of the disclosed technology, once the statistics have been computed, scoring and weighting of each network may be utilized to determine which networks rise above a particular threshold, and may be classified as "interesting." In accordance with an example embodiment of the disclosed technology, and weighting and/or scoring of the determined statistics may be accomplished using a heuristic scoring model, such as linear regression, neural network analysis, etc.

Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology provide tangible improvements in computer processing speeds, memory utilization, and/or programming languages. Such improvements provide certain technical contributions that can enable the detection of relationships among individuals. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective relationship-linking. As disclosed herein, the special-purpose computers and special-purpose programming language(s) disclosed herein can provide improved computer speed and/or memory utilization that provide an improvement in computing technology, thereby enabling the disclosed inventions.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of identity-based fraud indicators.

Determining relationships among records, for example, can follow the classical n-squared process for both time and disk space. According to an example implementation of the disclosed technology, light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Data profiling, data hygiene and data source consistency checking, while key components of the record linking process, have their own value within the data integration process and may be utilized herein for leverage even when record linking is not a necessary part of a particular data work unit. Implementations of the disclosed technology may utilize concepts such as term specificity to determine the relevance/weight of a particular field in the scope of the linking process, and a mathematical model based on the input data, rather than the need for hand coded user rules, which may be key to the overall efficiency of the method.

Certain example implementations of the disclosed technology may be utilized to prevent fraud by verifying identities, activities, and other factors, and using relationship information to determine where collusive activities might exist.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain embodiments of the disclosed technology may enable the detection of possible, probable, and/or actual identity theft-related fraud, for example, as associated with a request for credit, payment, or a benefit. Certain example implementations provide for disambiguating input information and determining a likelihood of fraud. In certain example implementations, the input information may be received from a requesting entity in relation to a request for credit, payment, or benefit. In certain example implementations, the input information may be received from a requesting entity in relation to a request for an activity from a business or government agency. In certain example implementations, the entity may be a natural person (i.e., human). In other example implementations, the entity may be represented as a natural person, but may actually be associated with a synthetic identity.

In accordance with an example implementation of the disclosed technology, input information associated with an entity may be processed, weighted, scored, etc., for example, to disambiguate the information. Certain implementations, for example, may utilize one or more input data fields to verify or correct other input data fields.

TABLE 2

Digital ID results

| Digital_id_result value | Description |
|---|---|
| success | The Digital ID matched an existing/known Digital ID |
| new_digital_id | A new Digital ID was generated |
| not_enough_attribs | There are not enough attributes present to generate a Digital ID (minimum of 2 entities excluding True IP are needed). |
| low_confidence | If the confidence threshold is enabled and the digital_id_confidence for the digital ID is below the configured threshold, then no digital ID is returned and digital_id_result is set to 'low_confidence'. |
| excluded | The exclusion policy has the ability to prevent the generation of a digital ID. If the exclusion policy decides to block/exclude Digital ID generation for a given transaction, then digital_id_result will be set to 'excluded'. |
| not_enough_weights | The exclusion policy also has the ability to manipulate the weightings for different entities based on behaviors detected by the rules. The exclusion policy can set a weighting to 0 to prevent it from being used within the Digital ID matching algorithm. Because of this a situation exists where there may be enough attributes present to generate a digital ID, but their weightings may have been zeroed out. This separate value is returned in this case to prevent confusion with 'not_enough_attribs" scenario. |

Table 2 provides additional information for the results of the Digital ID. In accordance with certain example implementations of the disclosed technology, a sub-set of entities (Account Number, Account Name, Account Login) may be restricted to local-only usage due to a low likelihood of an individual securing the same login/account name across multiple organizations. For example, John Smith may have signed-up with a first organization several years ago under the login username "johnsmith." Then a recent attempt to sign-up with a second vendor using the same login username may be unsuccessful as "johnsmith" was already taken, so the username "johnsmith723" may be used instead.

In accordance with certain example implementations of the disclosed technology, after a Digital ID has been created, certain example implementations of the disclosed technology may utilize the Digital ID to separate bad identities from good identities. Such knowledge may be utilized to validate legitimate returning customers and reduce transaction friction. Certain example implementations of the disclosed technology may be utilized to actively block attempts to access an account or conduct a transaction if suspicious behavior is detected. By accurately distinguishing good customers from fraudsters, cybercriminals impersonating legitimate customer may be quickly detected by their attempted fraudulent and/or anomalous transactions.

In certain example implementations, a trust score may be utilized as a comprehensive risk assessment score for Digital ID intelligence. Certain example implementations of the trust score may represent fraud risk, threat, vulnerability, and reputation of the Digital ID, and may leverage the big data power of a Digital Identity Network and global shared intelligence to generate such score. In certain example implementations, the following analytics components may be built into the trust score for a Digital ID: global reason codes, global smart rule variables, Digital ID pivoted variables, Digital ID confidence scores, fraud data, and/or potential threat data.

In certain example implementations, the trust score may be accessible to customers and can be used directly in the customer policies in making better decisions in identifying trusted consumers to reduce false positives. Certain example implementations of the disclosed technology may utilize the trust score in associated models to improve fraud detection performance. In certain example implementations, the one or more attribute variables can include a number or frequency of one or more of: devices, electronic messages, and transactions associated with the entity identifier. In certain example implementations, the aggregate threat score may further be based on known instances of fraud associated with the entity identifier. According to an example implementation of the disclosed technology, the aggregate threat score may include time-based decay weighs according to the temporal information. In certain example implementations, the entity or user is one or more of a human, a household, and a family. In certain example implementations, a plurality of attribute indications can represent assets that are attributed to the entity or user identifier.

According to certain example implementations of the disclosed technology, different modeling approaches may be utilized for implementing trust scores according to a Digital ID depending on the available data, desired accuracy, and/or time or computing constraints.

Certain example implementations of the disclosed technology may provide the following technical benefits and/or technical functions: (a) both online and offline data attributes may be utilized together to form a dynamic and unique persona identifier (ID) that is anonymized; the generative identity resolution process may be driven by real-world digitized interactions, not just data mapping to fields; a digital identity graph, leveraging machine learning, may connect the disparate online and offline attributes and express them as one unique persona identifier that is anonymized; complete anonymity is ensured with both the persona identifiers and underlying data attributes; the system is built upon tokenized, encrypted identity attributes that cannot be hacked or reversed into personally identifiable information (PII); a view of a persona identity and attributes may be provided through the merging of the offline and online data; a consistent, universal, and frictionless approach may be utilized across consumer touch points spanning new account openings, login transactions, and payment transactions.

Given a resolved digital identity and its activities in the Internet and mobile channels, a set of interface and analysis features are provided by embodiments disclosed herein for use in fraud prevention, identification, user classification with potential to pursue other use cases such as credit evaluation, cross device ad targeting and others.

According to an example implementation of the disclosed technology, the anonymized persona identifiers according to the disclosed technology are: (a) stable and representative; (b) accurate an encompassing; (c) explainable and relevant; and (d) safe. The anonymized persona identifiers, according to the disclosed technology, may be resistant to contamination by shared elements such as: shared IP address, shared email, and/or shared device. As a guidance for step one 90% of entities may need to be singular, 8% can belong to same household or place of work, 2% can be outright wrong. In other words, false positive tolerance for incorrect identity resolution i.e. a proportion of the population, will be able to be individually recognized vs households or organizations Given that users often have multiple assets of each class e.g. different private emails, work emails, lived in different homes, the concept of anonymized persona identifiers may only be as useful as it is able to create a singular entity that strongly correlates the assets. Without such correlation, there may be no information gain and value beyond the single tracked attribute. As a guidance the entities should converge at 90% single anonymized persona identifier for single person, 8% for 2 anonymized persona identifiers for single person and 2% with 3 or more.

The anonymized persona identifier may inspire confidence in the use of data. The data required to resolve an entity and the data attached to the entity may need to be current to the extent possible. As a high-level guidance entity resolution data (which emails belong to which anonymized persona identifier) can be current within 48 hours while events and assertions connected to the anonymized persona identifier should be near real time. The disclosed technology relates to an event-driven identity resolution process that may need to maintain global state in-order to ensure that each event is both a 'match' process and an 'insert' process. For example, a hacker can hit a user account in China and Australia seconds apart, and the global identity resolution may need to happen in real-time such that the same attacker is accurately identified, and the second attack can potentially be more thoroughly averted.

As identities may have different transient properties, a large divergence in identity linkages in a short period of time may indicate an attack on an identity. Certain example implementations of the disclosed technology provide the ability to resolve the longer-term stable identity while either flagging, ignoring, or dissolving short lived associations.

As used herein, the terms "data," "content," "information," and similar terms may be used interchangeably to refer to data capable of being transmitted, received, and/or stored in accordance with the disclosed technology. Thus, use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the terms "human identity," "user," "client," "consumer," and "customer" may be used interchangeably to refer, without limitation, to a human, client, customer, purchaser, shopper, user and the like who may be using any number of client devices and/or online identities to receive and interact with networked digital content.

The term "API" refers to an Application Programming Interface (API), which is a set of subroutine definitions, protocols, and tools for building application software. An API is a set of clearly defined methods of communication between various software components. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or other type of code may be loaded onto a computer, processor, or other programmable apparatus's circuitry to produce a machine, such that the computer, processor, or other programmable circuitry that execute the code on the machine create the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "data processing apparatus," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   one or more processors;
   memory in communication with the one or more processors;
   instructions stored in the memory that, when executed by the one or more processors, cause the system to perform:
      receiving, via a communications network, user identification (User ID) and associated personal identification information (PII) responsive to initiation of identity monitoring enrollment of a user via a user device;
      extracting, from the user device, unique device identification (Device ID);
      generating an anonymized digital identification (Digital ID) based on one or more of the Device ID and the PII;
      associating the Digital ID with the User ID;
      detecting, via a Digital Identity Network (DIN) in communication with a plurality of website monitoring application programming interfaces (APIs) executing on a corresponding plurality of websites, an identity-related event corresponding to the Digital ID;
      determining, using a machine learning model in communication with the one or more processors, whether the identity-related event meets one or more threshold criteria;
      generating an alert responsive to the threshold criteria being met by the identity-related event; and
      transmitting the alert.

2. The system of claim 1, wherein the alert comprises the User ID and identification of the identity-related event.

3. The system of claim 1, wherein the alert is transmitted to an identity monitoring service associated with the identity monitoring enrollment of the user.

4. The system of claim 1, wherein the alert is sent via one or more of text and e-mail to a user associated with the User ID.

5. The system of claim 1, wherein the threshold criteria is based on one or more of rules, logic, and trust tags.

6. The system of claim 1, wherein results of the determining are fed back to refine the machine learning model.

7. The system of claim 1, wherein generating the Digital ID comprises a combination of the User ID and the Device ID.

8. The system of claim 1, wherein the DIN is in communication with a plurality of business servers hosting the corresponding plurality of websites.

9. The system of claim 1, wherein the website monitoring APIs are configured to transmit encrypted event information to the DIN.

10. The system of claim 1, wherein the Device ID comprises one or more of: cellular service provider, media files, capacity, system information, model number, serial number, Wi-Fi address, Bluetooth address, IMEI number, ICCID number, firmware version, installed drivers, and installed fonts.

11. A method, comprising:
   receiving user identification (User ID) and associated personal identification information (PII) responsive to initiation of identity monitoring enrollment of a user via a user device;
   extracting, from the user device, unique device identification (Device ID);
   generating an anonymized digital identification (Digital ID) based on one or more of the Device ID and the PII;
   associating the Digital ID with the User ID;
   detecting, via a Digital Identity Network (DIN) in communication with a plurality of website monitoring application programming interfaces (APIs) executing on a corresponding plurality of websites, an identity-related event corresponding to the Digital ID;
   determining, using a machine learning model in communication with one or more processors, whether the identity-related event meets one or more threshold criteria;
   generating an alert responsive to the threshold criteria being met by the identity-related event; and
   transmitting the alert.

12. The method of claim 11, wherein the alert comprises the User ID and identification of the identity-related event.

13. The method of claim 11, wherein the alert is transmitted to an identity monitoring service associated with the identity monitoring enrollment of the user.

14. The method of claim 11, wherein the alert is sent via one or more of text and e-mail to a user associated with the User ID.

15. The method of claim 11, wherein the threshold criteria is based on one or more of rules, logic, and trust tags.

16. The method of claim 11, wherein results of the determining are fed back to refine the machine learning model.

17. The method of claim 11, wherein generating the Digital ID comprises a combination of the User ID and the Device ID.

18. The method of claim 11, wherein the DIN is in communication with a plurality of business servers hosting the corresponding plurality of websites.

19. The method of claim 11, wherein the website monitoring APIs are configured to transmit encrypted event information to the DIN.

20. The method of claim 11, wherein the Device ID comprises one or more of: cellular service provider, media files, capacity, system information, model number, serial number, Wi-Fi address, Bluetooth address, IMEI number, ICCID number, firmware version, installed drivers, and installed fonts.

* * * * *